United States Patent Office.

ALCIDE FRANÇOIS POIRRIER AND ZACHARIE ROUSSIN, OF PARIS, FRANCE, ASSIGNORS TO THE SOCIÉTÉ ANONYME DES MATIÈRES COLORANTES ET PRODUITS CHIMIQUES DE ST. DENIS, OF SAME PLACE.

PRODUCTION OF DIAZOIC COLORING-MATTERS.

SPECIFICATION forming part of Letters Patent No. 380,928, dated April 10, 1888.

Application filed December 29, 1887. Serial No. 259,299. (No specimens.) Patented in England September 19, 1887, No. 12,692.

*To all whom it may concern:*

Be it known that we, ALCIDE FRANÇOIS POIRRIER and ZACHARIE ROUSSIN, both citizens of the French Republic, residing in Paris, France, have invented certain new and useful Improvements in Azoic Coloring-Matters, (which have been patented in England, September 19, 1887, No. 12,692,) of which the following is a specification.

This invention relates more particularly to the production of new coloring-matters by the reaction of the diazoic derivatives of nitraniline and other nitro amines upon the isomers of naphthionic acid.

In our patent of January 21, 1879, No. 211,525, the manufacture is described of azoic coloring-matters by the reaction of the diazoic derivatives of nitraniline, of nitro-toluidine, of nitro-xylidine, and of nitro-naphthylamine upon the amines, the phenols, the naphthols, and the sulpho compounds of these bodies. Among the new coloring-matters described in that patent are those which result from the action of the diazoic derivatives of the different nitranilines, nitro-toluidines, nitro-xylidines, &c., upon naphthionic acid.

The present invention consists in the production of coloring-matters by the reaction of the diazoic derivatives of the same nitranilines, nitro-toluidines, &c., upon the different isomers of naphthionic acid, which were unknown when the aforesaid patent was applied for, and particularly upon the isomeric naphthionic acid which has been described by Witt, (Berichte der Deutschen Chemischen Gesellschaft, 1886, 19, page 578.) This acid is prepared in the following manner:

Into an apparatus of cast-iron provided with an agitator and means of cooling are introduced one hundred kilos of alpha-naphthylamine in the state of salt and three hundred and twenty-five kilos of fuming sulphuric acid of twenty-eight to thirty per cent. anhydride. Intimate mixture and sulpho-conjugation are to be effected at a maximum temperature of 25° centigrade. After two to three days the reaction is finished, the liquid is run into water, saturation is made with lime, and then the transformation into the soda salt is effected. It is the solution of this soda salt which we use for the manufacture of the new colors. The characteristics of this isomeric acid are described in the Berichte der Deutschen Chemischen Gesellschaft, 1886, 19, page 56. In solubility it is intermediate to the acid of Piria and the isomer termed "soluble" and more soluble than that lately patented by Ewer and Pick.

*Preparation of the coloring-matters.*—Nitrodiazo-benzol prepared by the ordinary process from 13.800 kilos of nitraniline is introduced into a solution of 22.300 kilos of the naphthionic acid of Witt in the state of soda salt. The reaction takes place in a slightly acid medium. After two or three hours of agitation the coloring-matter is obtained but slightly soluble in the medium in which it has been formed. It is received on a filter and deprived of surplus moisture. The paste is then mixed in with a sufficient quantity of carbonate of soda to neutralize it, and the salt obtained is made insoluble by means of a little common salt pressed and dried. With paranitraniline a coloring-matter is obtained more violet than that described in the patent above mentioned. With metanitraniline and the other isomer a reddish-yellow coloring-matter is obtained, but more approaching violet than the corresponding ones of the patent. If the nitraniline is replaced by 15.200 kilos of nitro-toluidine, fusible at 107° centigrade, a yellowish-red coloring-matter is obtained; by 16.600 kilos of nitro-xylidine, fusible at 123° centigrade, a more yellow red than the preceding, and by 18.800 kilos of nitro-naphthylamine a red brown.

The new coloring-matters described are, in the state of salts, soluble in water, and can be employed in dyeing as a powder more easily than their isomers described in the patent.

We do not limit ourselves to the proportions of reagents indicated, and we include in the invention the treatment of the different isomers and homologues of alpha-naphthylamine sulpho.

We claim as our invention or discovery—

1. The process of producing coloring-matters by the reaction of the nitrodiazo benzols, toluols, xylols, &c., with the isomers and homologues of alpha-naphthylamine sulpho, especially the naphthionic acid of Witt, substantially as described.

2. The new coloring-matters having the described properties and colors, products of the combination of nitrodiazo-benzols, nitrodiazo-toluols, nitrodiazo-xylols, &c., with the isomers and homologues of naphthionic acid, especially the naphthionic acid of Witt, substantially as described.

In witness whereof we have hereunto signed our names in the presence of two subscribing witnesses.

ALCIDE FRANÇOIS POIRRIER.
ZACHARIE ROUSSIN.

Witnesses:
JULES ARMENGAUD, Jeune,
CHARLES MARDELET.